United States Patent [19]

Stier et al.

[11] 4,352,289
[45] Oct. 5, 1982

[54] FUEL CONSUMPTION INDICATOR

[75] Inventors: Bernhard Stier, Kelkheim-Fischbach; Gerhard Ruschek, Hattersheim, both of Fed. Rep. of Germany

[73] Assignee: VDO Adolf Schindling AG, Fed. Rep. of Germany

[21] Appl. No.: 220,163

[22] Filed: Dec. 24, 1980

[30] Foreign Application Priority Data

Dec. 24, 1979 [DE] Fed. Rep. of Germany ....... 2952268

[51] Int. Cl.³ ............................................. G01L 23/24
[52] U.S. Cl. ........................................ 73/114; 73/115
[58] Field of Search .......................... 73/115, 114, 711

[56] References Cited

U.S. PATENT DOCUMENTS 4,282,746  8/1981  Henke et al. .......................... 73/114
4,327,577  5/1982  Fiala ..................................... 73/115

Primary Examiner—Jerry W. Myracle
Attorney, Agent, or Firm—Eric P. Schellin

[57] ABSTRACT

A fuel consumption indicator for a vehicle includes an indication manometer having a tube spring connected with engine vacuum and connected to drive a pointer via an electromagnetic control having a variable lever arrangement positionable in dependence upon the gear selected for the vehicle.

4 Claims, 2 Drawing Figures

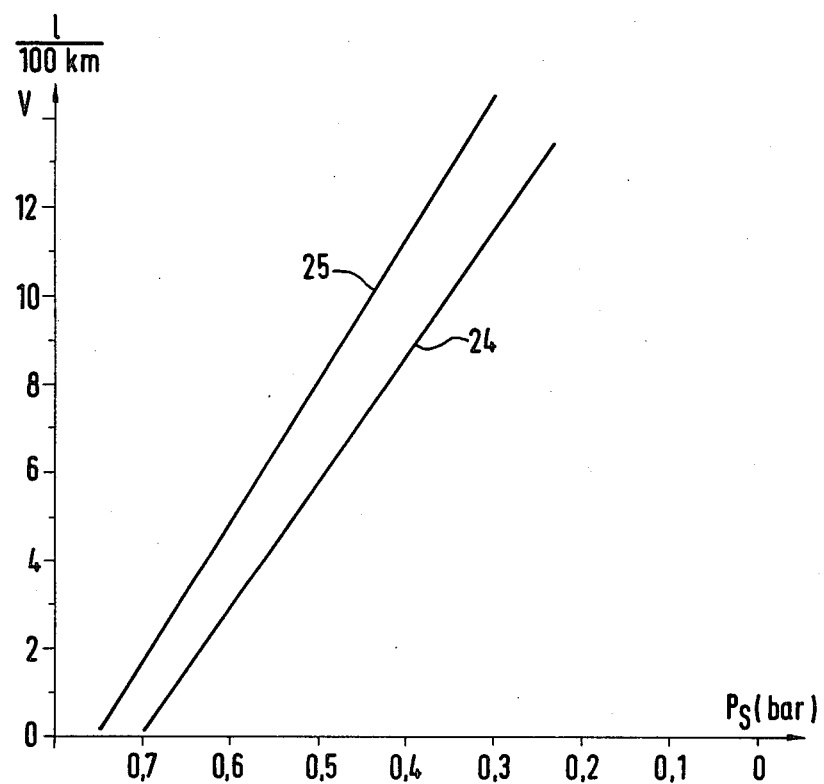

FUEL CONSUMPTION INDICATOR

BACKGROUND OF THE INVENTION

1. Field of the Invention

The invention relates to an apparatus for the indication of the fuel consumption per distance unit of a motor vehicle, and more particularly, to such an apparatus with means to compensate for different gears selected for the vehicle.

2. Prior Art

In such known devices for the indication of the fuel consumption of an Otto engine per distance unit by means of a pressure meter, especially an indication manometer, the basic fact is that a fixed relation exists between the vacuum prevailing in the suction pipe of the Otto engine, the suction pipe pressure, and the fuel consumption per distance unit. Such a fixed interrelation, according to which the scale of the indication manometer is initially calibrated, exists, however, only for a prespecified gear ratio between the crankshaft of the Otto engine and the drive wheels. In other words, the fuel consumption per distance unit, which in this case is usually to be indicated in liters per 100 km, depends in a motor vehicle with a gearshift mechanism on the gear inserted at each instance. This means that the correct fuel consumption per distance unit can be measured exactly in an absolute value for a specific gear only. Ordinarily, this is the direct, that is to say, the fourth gear. For the smaller gears, to be sure, the indication is still correct in its tendency, but cannot give the driver the important information about the correct gear choice, since in the shifting-back from the direct gear into the smaller gear, a decrease in consumption is always indicated, although in fact, a substantial increase in consumption may occur.

In order to overcome this drawback, it is known to switch indicating manometers by electrically controlled means for influencing the indication in dependency on the inserted gear of the gearshift mechanism, to the effective position for the direct gear only but not for the lower gears. In detail, this takes place by a ventilation aperture in the connecting piece of the indication manometer, which aperture can be closed by a closure element actuated by a folding knife-edge relay. The folding knife-edge relay is arranged in the circuit of a battery in which a key switch is also inserted which is connected with the gear choice lever in such a way that the folding knife-edge relay lifts the closure element from the ventilation aperture when the direct gear is not inserted. Thereby, indication errors are avoided. It is in this case, however, disadvantageous that the driver is informed on fuel consumption only when the direct gear is inserted, that is to say, when one gear is inserted. In this known apparatus there may be the further disadvantage that with insertion of the direct gear (notwithstanding the closing of the ventilation bore by the closure element) the indication does not become effective immediately since in the tube spring of the indication manometer the vacuum corresponding to the suction pipe pressure must first be built up.

A correct indication of the fuel consumption per distance unit for two selectively insertable gears is achieved, in another apparatus belonging to prior art, by arranging the suction pipe and the indication manometer a pneumatic pressure converter, controlled in dependency on the position of the shift lever. This pressure converter operates in detail according to the principle of power compensation by means of a valve device actuated by a double diaphragm system. This valve device changes the relation between the suction pipe pressure and the pressure conducted to the indication manometer in the ratio of the diaphragm surface acted upon by these pressures. The ratio of the pressure responsive diaphragm surface thus presents the ratio of the multiplications between the direct and the following lower gears.

This apparatus which belongs to the prior art permits, to be sure, a correct indication of the fuel consumption per distance unit in a scaling of the indication manometer for two gears. It is, however, due to the electromagnetically controllable pneumatic pressure converter, relatively expensive.

An inexpensive apparatus for the indication of fuel consumption per distance unit which applies to several gears can be produced by associating with each gear stage a scale of the indication manometer. This multiple scaling of the indication manometer, however, is relatively complex and requires too much attention by the driver.

SUMMARY OF THE INVENTION

The purpose of the present invention is, therefore, the further development of an apparatus of the kind discussed above in such a manner that it permits at low expense a distinct indication of a quantitative fuel consumption per distance unit at the moment concerned, for at least two gears or stages of the gearshift mechanism.

This problem is solved by an apparatus with an indication manometer having a tube spring connected with engine vacuum and connected to drive a pointer via an electromagnetic control including a variable lever arrangement positionable in dependence upon the gear selected.

The apparatus is particularly advantageous since it requires only a single scale for at least two gears, which scale is, therefore, particularly distinct, and since the adjustment of the indication to the gear ratio in dependence upon the gearshift mechanism takes place automatically, with the employment of inexpensive means, by modification of the mechanical gear ratio between the tube spring and the pointer shaft of the indication manometer. This modification of the gear ratio permits, in addition, a particularly safe structure. A complicated modification and adjustment of the pressure that acts upon the tube spring is therefore eliminated.

In a particularly advantageous manner, the lever arrangement includes a toothed segment on one end of a first lever or arm, with a connecting rod connected between the manometer tube and the other end of the arm in such a manner that the point of connection between the connecting rod and the arm is adjusted to be closer or farther away from the axis of rotation of the arm in dependence on the gear selected. The advantage consists especially in the fact that the modification of the mechanical connection between the movable end of the tube spring and the pointer shaft can be manufactured in a simple manner. This manufacture provides essentially that a connecting rod, usually provided as a matter of principle, is adjustably hinged between the movable end of the tube spring and the toothed segment, in which structure the adjustment takes place through electromagnetic control in dependency on the gear inserted on the gearshift mechanism. The adjustment is carried out in such a way that the hinged point of the connecting rod is distant from the axis of rotation of the toothed segment when the direct gear is inserted, so that the gear ratio between the free end of the tube spring and the pointer pinion is comparatively small. When a lower gear is inserted, however, the hinged point is displaced toward the axis of rotation of the toothed segment, whereby at a prespecified deflection of the free end of the tube spring a comparatively large movement of the pointer pinion takes place. The modification of the mechanical gear ratio is adjusted in such a way that at the direct gear as well as at the lower gear the same scale for the fuel consumption per distance unit applies.

In a further development of the apparatus, it is feasible to provide according to the same principle by means of the electromagnetic control still another modification of the position of the connecting rod with relation to the axis of rotation of the toothed segment, so that it is possible at four possible different distances from the axis of rotation to indicate for four gear stages the quantitatively correct fuel consumption per distance unit with one scale.

The electromagnetic control of the adjustment of the connecting rod comprises a plunger or core of an electromagnetic coil whose excitation is controlled from a switch responsive to the position of an element of the gearshift mechanism. This electromagnetic control constructed with the usual means ensures, in connection with the mechanical shifting of the connecting rod, a particularly safe operation in these indication movements.

The indication manometer which is shiftable by means of the connecting rod is constructed with a toothed segment on one end of an arm having an elongate slot in its other end, and pivotally mounted between its ends. The ends of the slot constitute hinge points which cooperate with a hinge pin on the connecting rod.

BRIEF DESCRIPTION OF THE DRAWINGS

The invention will be described in greater detail with the aid of the drawings, in which:

FIG. 2 is a graphical representation wherein the fuel consumption per distance unit is shown in dependence on the suction pipe pressure for the third and fourth gears.

DETAILED DESCRIPTION OF THE PREFERRED EMBODIMENTS

Figure 1:
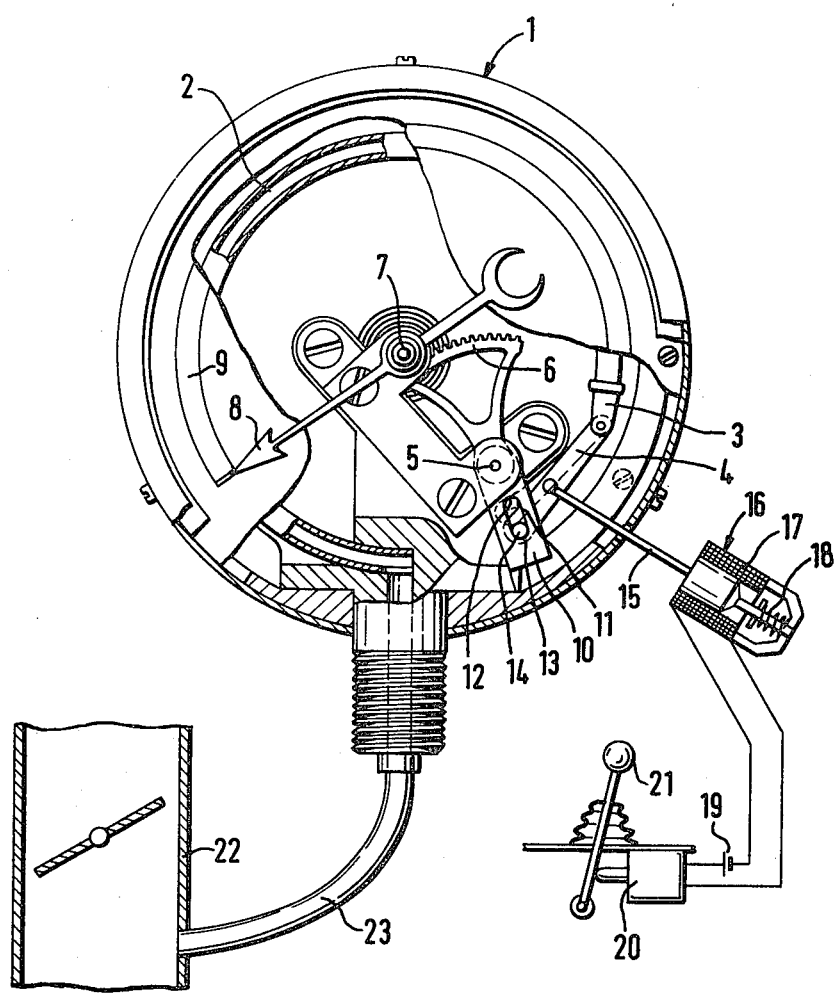
FIG. 1 is a diagrammatic view, with portions cut away, and portions shown in section, of the apparatus with a shiftable indication manometer.

In FIG. 1, numeral 1 designates an indication manometer constructed as a tube spring manometer. The indication manometer comprises a tube spring 2 whose free end 3, which is movable under the influence of the inside pressure of the tube spring, is hinged to a connecting rod 4. Connecting rod 4 is connected with an arm 6 having a toothed segment 6a on one end and rotatable about an axis of rotation 5. The toothed segment engages in a known manner a pinion of a pointer shaft 7 wherewith a pointer 8 is connected. The pointer sweeps a scale 9 which is indicated in diagram only.

For the shifting of the mechanical gear ratio between the movement of the free end 3 of the tube spring and the angle of rotation of the toothed segment 6, the connecting rod is adjustably connected to the other end 10 of the arm 6 which extends beyond the axis of rotation of the arm. For this purpose, the arm is provided with an oblong hole 11 with a hinging point 12 facing the axis of rotation 5 and a hinging point 13 facing away from the axis of rotation 5. A hinge pin 14 inserted into the connecting rod abuts depending on the adjustment of the connecting rod, against one or the other of the hinging points. The position drawn in full lines of the connecting rod 4 corresponds to that for the direct fourth gear while the position shown in lines of the connecting rod is provided for a lower gear, such as the third one.

For the adjustment of the connecting rod, the latter is coupled with a plunger of an electromagnet system 16 via a coupling rod 15, which plunger electromagnet system comprises an excitation coil 17. A spring 18 strives to press the plunger forward from the excitation coil, while the excitation coil has the tendency to pull the plunger inward when it is excited.

The plunger is arranged in a circuit with a vehicle battery 19 and a key switch 20. The key switch is connected to an element connected with a gear selection lever 21 in such a manner that a contact is closed in the key switch when the direct fourth gear is inserted. In this case, consequently, the excitation coil is excited and the connecting rod is pulled into the position shown in full lines. When the key switch is open, spring 18 presses the plunger outwardly of the coil, and the connecting rod into the position drawn in broken lines.

Consequently, in dependence on the suction pipe pressure prevailing in a suction pipe 22 which passes via a line 23 to the tube spring, an angle of pointer 8 that corresponds to the gear stage selected at each instance is covered in distance.

The distance between hinging points 12 and 13 chosen is of such length that a gear ratio modification between the movement of the free end 3 and the pointer shaft occurs which corresponds to the modified gear ratio between the direct gear and the next lower gear.

In the embodiment shown, therefore, the scale 9 can be devised in such a way that it applies for the direct as well as for the next lower gear.

In another embodiment, further intermediate positions of plunger 16 can be provided, corresponding to variously graded currents, so that the connecting rod between the shown end positions 12 and 13 can assume further positions so as to make possible in this manner also a correct indication of the fuel consumption per distance unit for further gear stages.

In the diagrammatical illustration of FIG. 2, the suction pipe pressure is illustrated along the abscissa $P_S$, and the fuel consumption per distance along the ordinate V. The curve 24 corresponds in this illustration to the fuel consumption per distance unit for the inserted direct gear, and the curve 25 for the inserted third gear. The ascents of these curves are chosen corresponding to the ratios set according to the positions of connecting rod 4 in FIG. 1, in such a manner that the correct fuel consumption per distance unit for the fourth gear and for the third gear is indicated on a scale corresponding to ordinate V in dependence on the suction pipe pressure. In this structure, care must be taken by the construction of the measuring mechanism in FIG. 1, that the zero point of the indication remains preserved while the full deflection is accomplished according to the gear ratio. FIG. 2 shows that at a prespecified suction pipe pressure of 0.5, e.g., the fuel consumption per distance unit in the fourth gear amounts to about 5.5 liter per 100 km, while at the same suction pipe pressure at an inserted third gear, however, the fuel comsuption is 8 liter per 100 km. These values can, as explained, at correct choice of the gear ratio be read off on the same scale 9.

What we claim as new and desire to secure by U.S. Letters Patent is:

1. Apparatus for the indication of fuel consumption per distance unit of a motor vehicle with an Otto engine and a gearshift mechanism, in which an indication manometer having a tube spring is attached to engine manifold vacuum via a suction pipe for the measurement of the engine manifold vacuum, and is connected, via a pointer mechanism, with a pointer shaft, and with electromagnetically controlled means for influencing the indication in dependence on the gear inserted of the gearshift mechanism, wherein:

the electromagnetically controlled means includes
a coil;
a plunger; and
a key switch connected to control excitation of the coil in dependence on the gear selected; and
connecting means between the tube spring and pointer shaft adjustable by the plunger of the electromagnetically controlled means such that at the insertion of at least two gear stages, the same scale for the fuel consumption per distance unit applies.

2. Apparatus for the indication of fuel consumption as claimed in claim 1, wherein:

the connection between the pointer shaft and tube spring includes an arm with a toothed segment on one end thereof which engages a pointer pinion on the pointer shaft; and
a connecting rod connected between a movable end of the tube spring and the other end of the arm;
the connection between the connecting rod and the arm being adjustable between a position distant from the axis of rotation of the arm and a position close to the axis of rotation, under the influence of the electromagnetically controlled means.

3. Apparatus for the indication of fuel consumption as claimed in one of claims 1 or 2, wherein:

the connecting rod is coupled with the plunger; and
the key switch is adjacent to an element of the gearshift mechanism to be actuated thereby.

4. Apparatus for the indication of fuel consumption as claimed in claim 2, wherein:

the other end of the arm has an elongate slot whose ends are shaped as hinging points; and
the connecting rod has a hinge pin engaged in the slot.

* * * * *